US009523987B2

(12) United States Patent
Fukudome et al.

(10) Patent No.: US 9,523,987 B2
(45) Date of Patent: Dec. 20, 2016

(54) CAPACITY CONTROL VALVE

(75) Inventors: Kohei Fukudome, Tokyo (JP); Hideki Higashidouzono, Tokyo (JP); Masayuki Futakuchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 158 days.

(21) Appl. No.: 14/125,284

(22) PCT Filed: May 17, 2012

(86) PCT No.: PCT/JP2012/062575
§ 371 (c)(1),
(2), (4) Date: Dec. 10, 2013

(87) PCT Pub. No.: WO2012/172914
PCT Pub. Date: Dec. 20, 2012

(65) Prior Publication Data
US 2014/0099214 A1   Apr. 10, 2014

(30) Foreign Application Priority Data
Jun. 15, 2011   (JP) .................................. 2011-132757

(51) Int. Cl.
*F16K 31/363* (2006.01)
*F16K 31/08* (2006.01)
(Continued)

(52) U.S. Cl.
CPC ......... *G05D 7/0106* (2013.01); *F04B 27/1804* (2013.01); *F04B 2027/1827* (2013.01);
(Continued)

(58) Field of Classification Search
CPC .................... F04B 27/1804; F04B 2027/1827; F04B 2027/1845
(Continued)

(56) References Cited

U.S. PATENT DOCUMENTS 5,094,589 A * 3/1992 Terauchi et al. ........... 417/222.2
6,589,020 B2 * 7/2003 Kimura et al. ............ 417/222.2
(Continued)

FOREIGN PATENT DOCUMENTS

JP   2003-322086 A   11/2003
JP   2007-064028 A   3/2007
(Continued)

OTHER PUBLICATIONS

Notification of Transmittal of Translation of the International Preliminary Report on Patentability (PCT/IB/338) mailed Jan. 3, 2014, with International Preliminary Report on Patentability (PCT/IB/373) and Written Opinion of the International Searching Authority (PCT/ISA/237), for corresponding international application PCT/JP2012/062575.
(Continued)

*Primary Examiner* — Marina Tietjen
*Assistant Examiner* — Seth W Mackay-Smith
(74) *Attorney, Agent, or Firm* — Law Office of Katsuhiro Arai

(57) ABSTRACT

In a capacity control valve, a discharged-fluid-receiving part having a diameter that is larger than the diameter of a valve hole interconnecting a first valve chamber and a third valve chamber is provided to the outer periphery section of a third valve part. It is thereby possible to obtain a capacity control valve in which, when the first valve part opens, the discharged-fluid-receiving part receives the pressure of the discharged fluid, the actuation response of the valve body during an opening action is moderated, an excessive increase in the sensitivity to a rise in pressure in the crank chamber caused by a rapid increase in the amount of coolant flowing into the crank chamber is prevented, and the action of the valve body is stable.

7 Claims, 6 Drawing Sheets

(51) Int. Cl.
    *F15B 13/043*    (2006.01)
    *F16K 11/076*    (2006.01)
    *F04B 1/29*      (2006.01)
    *G05D 7/01*      (2006.01)
    *F04B 27/18*     (2006.01)

(52) U.S. Cl.
    CPC ..... *F04B 2027/1845* (2013.01); *F16K 11/076* (2013.01); *F16K 31/363* (2013.01)

(58) Field of Classification Search
    USPC ...... 137/596, 625.25; 251/129.02; 477/222.2
    See application file for complete search history.

(56) References Cited

U.S. PATENT DOCUMENTS

| | | | |
|---|---|---|---|
| 6,662,582 B2* | 12/2003 | Hirota et al. | 62/228.3 |
| 6,772,990 B2* | 8/2004 | Sasaki et al. | 251/129.03 |
| 2003/0145615 A1 | 8/2003 | Sasaki et al. | |
| 2006/0280616 A1* | 12/2006 | Umemura et al. | 417/222.2 |
| 2008/0138213 A1* | 6/2008 | Umemura et al. | 417/222.2 |
| 2009/0183786 A1 | 7/2009 | Iwa et al. | |
| 2011/0091334 A1* | 4/2011 | Taguchi | F04B 27/1804 417/222.1 |

FOREIGN PATENT DOCUMENTS

| | | |
|---|---|---|
| WO | 2006/090760 A1 | 8/2006 |
| WO | 2007/119380 A1 | 10/2007 |

OTHER PUBLICATIONS

International Search Report (ISR) mailed Aug. 14, 2012, issued for International application No. PCT/JP2012/062575.
An Office Action issued by the State Intellectual Property Office of China, mailed May 22, 2015, with a search report (May 14, 2015) for Chinese counterpart application No. 201280023790.4.
A Second Notification of Reason for Refusal issued by the State Intellectual Property Office of China, mailed Jan. 26, 2016, for Chinese counterpart application No. 201280023790.4.
A Third Office Action issued by the State Intellectual Property Office of China, mailed Jul. 6, 2016, for Chinese counterpart application No. 201280023790.4.

* cited by examiner (a)

(b)

CAPACITY CONTROL VALVE

This application is the U.S. National Phase under 35 U.S.C. §371 of International Application PCT/JP2012/062575, filed May 17, 2012, which claims priority to Japanese Patent Application No. 2011-132757, filed Jun. 15, 2011. The International Application was published under PCT Article 21(2) in a language other than English.

TECHNICAL FIELD

The present invention relates to a capacity control valve for variably controlling the capacity or the pressure of a working fluid, and particularly to a capacity control valve for controlling, according to pressure load, the discharge amount of, e.g., a variable capacity compressor used in an air conditioning system for an automobile and the like.

BACKGROUND ART

Swash plate variable capacity compressors used in air conditioning systems for automobiles or other applications comprise: a rotary shaft, which is rotatably driven by the rotating force of the engine; a swash plate, connected to the rotary shaft so that the tilt angle is variable; a piston for compression, connected to the swash plate; and other components. The tilt angle of the swash plate is varied, whereby the stroke of the piston is varied and the amount of the coolant gas discharged is controlled.

The tilt angle of the swash plate can be continuously changed by appropriately controlling the pressure in the control chamber (crank chamber) housing the swash plate and adjusting the state of balance between pressures applied to both surfaces of the piston, using a capacity control valve, which is driven so as to open or close by an electromagnetic force, while utilizing the intake pressure of an intake chamber for drawing in coolant gas, the discharge pressure of a discharge chamber for discharging the coolant gas pressurized by the piston, and the control chamber pressure in the control chamber.

A known capacity control valve of such description is one comprising, as shown in FIG. 5: discharge-side channels 73, 77, 74 interconnecting the discharge chamber and the control chamber; a first valve chamber 82 formed partway along the discharge-side channels; intake-side channels 71, 72, 74 interconnecting the intake chamber and the control chamber; a second valve chamber (actuation chamber) 83 formed partway along the intake-side channels; a valve body 81 formed so that a first valve part 76, which opens/closes the discharge-side channels 73, 77, 74 and which is arranged in the first valve chamber 82, and a second valve part 75, which opens/closes the intake-side channels 71, 72, 74 and which is arranged in the second valve chamber 83, integrally perform a reciprocating motion and perform a mutually opposite opening/closing action; a third valve chamber (capacity chamber) 84 formed partway along the intake-side channels 71, 72, 74 nearer the control chamber; a pressure-sensitive body (bellows) 78, which is arranged in the third valve chamber, exerts an urging force in an extending (expanding) direction, and contracts with an increase in surrounding pressure; a valve seat body (engaging part) 80, which is provided to the free end, in the direction of expansion/contraction, of the pressure sensitive body, and which has an annular seat surface; a third valve part (open-valve connection part) 79, which integrally moves with the valve body 81 in the third valve chamber 84 and which can open or close the intake-side channels by engaging with or detaching from the valve seat body 80; a solenoid S for exerting an electromagnetic driving force on the valve body 81; and other components (hereafter referred to as "prior art;" e.g., refer to Patent Reference 1.)

In this capacity control valve 70, even if a clutch mechanism is not provided to the variable capacity compressor with regards to capacity control, if there is a need to change the control chamber pressure, the discharge chamber and the control chamber can be interconnected and the pressure Pc in the control chamber (control chamber pressure) can be adjusted.

Specifically, as shown by a dashed line in FIG. 6, if there is an increase in the cooling load during cooling, the electromagnetic driving force increases, and a force acts so as to reduce the degree of opening of the first valve part 76 (see dash-single-dot line at the bottom left in FIG. 6). When the degree of opening of the first valve part 76 is reduced, the amount of coolant flowing into the crank chamber decreases, the pressure in the crank chamber decreases, and the tilt of the swash plate (angle with respect to a plane perpendicular to the drive shaft) increases. Meanwhile, if the cooling load is small, the electromagnetic driving force decreases, and a force acts so as to increase the degree of opening of the first valve part 76 (see dash-double-dot line at the top right in FIG. 6), the amount of coolant flowing into the crank chamber increases, the pressure in the crank chamber increases, and the tilt of the swash plate decreases.

If the control chamber pressure Pc increases while the variable capacity compressor is in a stopped state, the third valve part (open-valve connection part) 79 and the valve seat body (engaging part) 80 detach. When the solenoid S is switched on and the valve body 81 is activated in this state, the intake-side channels are opened and the intake chamber and the control chamber are interconnected.

A swash plate variable capacity compressor comprising the above capacity control valve 70 is "externally" controlled, where the intake pressure is controlled according to an external signal. Since the valve body 81 has a high actuation response, when the electromagnetic force is reduced and the first valve part 76 is opened, there is a tendency for the valve to open at high speed, the amount of coolant flowing into the crank chamber to increase rapidly, and the sensitivity to the rise in pressure in the crank chamber to also increase (see dashed line in FIG. 6). If the sensitivity to the rise in pressure in the crank chamber increases excessively, there may be instances in which the discharge capacity decreases excessively, the action of the valve body 81 becomes unstable, resulting in unstable phenomena such as "hunting." This tendency is more likely to occur if the valve body 81 has a high actuation response. With regards to air conditioning control using an automotive air conditioning device in which this swash plate variable capacity compressor is used, hunting may not only be accompanied by temperature fluctuation in the vehicle chamber, adversely affecting air conditioning control, but may cause torque fluctuation in the compressor, adversely affecting the engine.

CITATION LIST

Patent Literature

Patent Reference 1: International Publication No. 2006/090760

SUMMARY OF INVENTION

Technical Problem

The present invention has been contrived in order to solve the problem of the prior art described above, it being an object of the present invention to provide a capacity control valve in which the actuation response of the valve body during an opening action during capacity control is moderated as shown by a solid line in FIG. 6, whereby an excessive increase in the sensitivity to a rise in pressure in the crank chamber, caused by a rapid increase in the amount of coolant flowing into the crank chamber, is prevented; and in which the action of the valve body is stable.

Solution to Problem

Firstly, in order to achieve the above-mentioned object, the capacity control valve is characterized in being provided with:

a discharge-side channel for interconnecting a discharge chamber for discharging a fluid and a control chamber for controlling the amount of the fluid discharged;

a first valve chamber formed partway along the discharge-side channel; an intake-side channel for interconnecting an intake chamber for drawing in the fluid and the control chamber; a second valve chamber formed partway along the intake-side channel;

a valve body integrally comprising a first valve part for opening/closing the discharge-side channel in the first valve chamber and a second valve part for opening/closing the intake-side channel in the second valve chamber, a reciprocating motion performed by the valve body causing mutually opposite opening/closing actions to be performed; a third valve chamber formed partway along the intake-side channel, nearer the control chamber than the second valve chamber;

a pressure-sensitive body arranged in the third valve chamber, the pressure-sensitive body extending and thereby exerting an urging force in a direction so as to open the first valve part, and contracting in concert with an increase in ambient pressure;

an adaptor provided to a free end, in the direction of extension, of the pressure-sensitive body, the adaptor having an annular seat surface;

a third valve part having a tapered engaging surface, which moves integrally with the valve body in the third valve chamber and engages/disengages with respect to the seat surface of the adaptor, thereby opening/closing the intake-side channel; and a solenoid for exerting an electromagnetic driving force on the valve body in a direction so as to close the first valve part, in response to a pulse width modulation signal having a uniform frequency;

a discharged-fluid-receiving part of larger diameter than the diameter of a valve hole interconnecting the first valve chamber and the third valve chamber, the discharged-fluid-receiving part being provided to an outer periphery section of the third valve part.

Secondly, a capacity control valve according to a first aspect of the present invention is characterized in that a surface of the discharged-fluid-receiving part that receives the discharged fluid is provided as a flat surface orthogonal to a direction in which the discharged fluid flows.

Thirdly, a capacity control valve according to a first aspect of the present invention is characterized in that the surface of the discharged-fluid-receiving part that receives the discharged fluid is provided as a flat or a curved surface {inclined} upstream at an acute angle relative to a plane that is orthogonal to a direction in which the discharged fluid flows.

Fourthly, a capacity control valve according to one of first to third aspects of the present invention is characterized in that the discharged-fluid-receiving part is formed by providing a flange to the outer periphery section of the third valve part.

Fifthly, a capacity control valve according to one of first to fourth aspects of the present invention is characterized in that the outside diameter of the discharged-fluid-receiving part is set to 120% to 170% of the diameter of the valve hole.

Sixthly, a capacity control valve according to one of first to fifth aspects of the present invention is characterized in that the clearance between a surface of the discharged-fluid-receiving part that receives the pressure of the discharged fluid and a body-side surface that faces the surface is set to 210% to 250% of the maximum stroke of the valve body when the valve is closed.

Advantageous Effects of Invention

The present invention has the following excellent effects.

(1) When the first valve part opens, the discharged-fluid-receiving part receives the pressure of the discharged fluid. Therefore, it is possible to obtain a capacity control valve in which the actuation response of the valve body during the opening action is moderated, an excessive increase in the sensitivity to a rise in pressure in the crank chamber caused by a rapid increase in the amount of coolant flowing into the crank chamber is prevented, and the action of the valve body is stable. Therefore, in air-conditioning control using an automotive air-conditioning device in which there is used a swash plate variable capacity compressor fitted with the capacity control valve of the present invention, it is possible to prevent any occurrence of temperature fluctuation in the vehicle compartment, adverse effect on air conditioning control, torque fluctuation in the compressor, adverse effect on the engine, and other problems.

Also, since the engaging surface of the third valve part that engages with the seat surface of the adapter has a tapered shape, the third valve part and the adapter can be engaged/disengaged with respect to each other in a straightforward and reliable manner.

(2) The surface of the discharged-fluid-receiving part that receives the discharged fluid being provided as a flat surface orthogonal to the flow direction of the discharged fluid makes it possible to receive the pressure of the discharged fluid in an efficient manner. The surface of the discharged-fluid-receiving part that receives the discharged fluid being provided as a flat or a curved surface {inclined} upstream at an acute angle relative to a plane that is orthogonal to the flow direction of the discharged fluid makes it possible to receive pressure from a greater amount of the discharged fluid. The discharged-fluid-receiving part being formed by providing a flange to the outer periphery section of the third valve part makes it possible to reduce the weight and facilitate manufacture of the discharged-fluid-receiving part.

(3) The outside diameter of the discharged-fluid-receiving part being set to 120% to 170% of the diameter of the valve hole makes it possible to more reliably prevent rebounding of the first valve part during capacity control.

(4) The clearance between a surface of the discharged-fluid-receiving part that receives the pressure of the discharged fluid and a body-side surface that faces the surface being set to 210% to 250% of the maximum stroke of the valve body makes it possible to secure an adequate flow rate of the discharged fluid in the discharge-side channels interconnecting the discharge chamber and the control chamber.

DESCRIPTION OF EMBODIMENTS

An embodiment of the capacity control valve according to the present invention will now be described in detail with reference to the accompanying drawings. However, this is not provided by way of limitation to the interpretation of the present invention; a variety of modifications, amendments, and improvements based on the knowledge of a person skilled in the art are possible without departing from the scope of the present invention.

Figure 1:
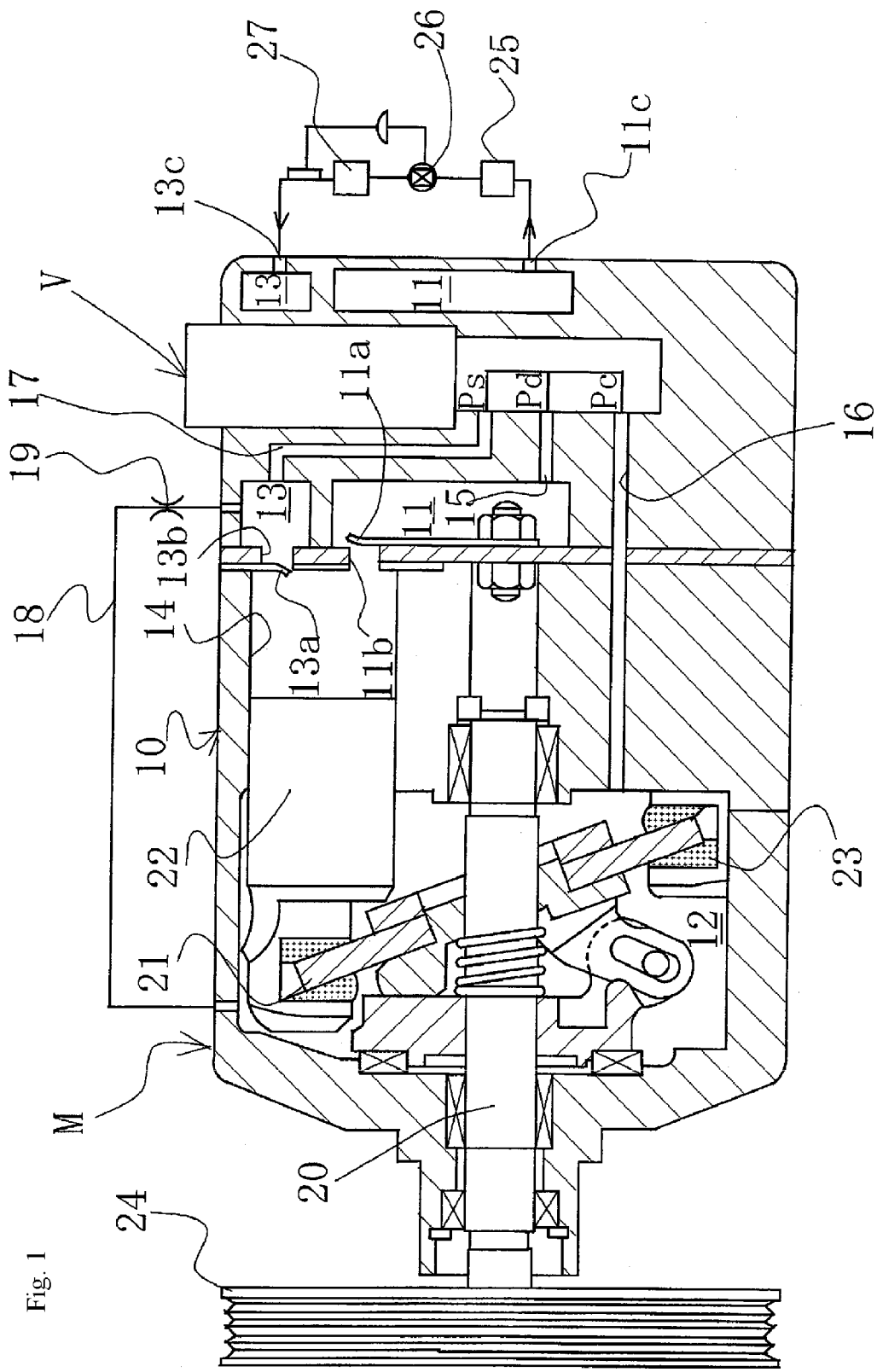
FIG. 1 is a schematic configuration diagram showing a swash plate variable capacity compressor provided with a capacity control valve according to the present invention.

A swash plate variable capacity compressor M comprises, as shown in FIG. 1: a discharge chamber 11; a control chamber (also referred to as a crank chamber) 12; an intake chamber 13; a plurality of cylinders 14; a port 11b interconnecting the cylinders 14 and the discharge chamber 11, the port 11b being opened/closed by a discharge valve 11a; a port 13b interconnecting the cylinders 14 and the intake chamber 13, the port 13b being opened/closed by an intake valve 13a; a discharge port 11c and an intake port 13c connected to an external cooling circuit; a interconnecting channel 15, which functions as a discharge-side channel interconnecting the discharge chamber 11 and the control chamber 12; a linking channel 16, which functions both as a discharge-side channel and as an intake-side channel interconnecting the control chamber 12 and the intake chamber 13; a casing 10 demarcating a interconnecting channel 17, which functions as a intake-side channel, and other elements; a rotary shaft 20 rotatably provided so as to protrude outwards from within the control chamber (crank chamber) 12; a swash plate 21, which rotates integrally with the rotary shaft 20 and which is connected to the rotary shaft 20 so that the tilt angle is variable; a plurality of pistons 22 fitted into each of the cylinders 14 so as to be capable of reciprocating motion; a plurality of connection members 23 for connecting the swash plate 21 and each of the pistons 22; a driven pulley 24 mounted on the rotary shaft 20; a capacity control valve V of the present invention incorporated into the casing 10; and other elements.

An interconnecting channel 18, which directly links the control chamber (crank chamber) 12 and the intake chamber 13, is provided to the swash plate variable capacity compressor M; and a fixed orifice 19 is provided to the interconnecting channel 18.

A cooling circuit is connected to the swash plate variable capacity compressor M through the discharge port 11c and the intake port 13c. A condenser 25, an expansion valve 26, and an evaporator 27 are sequentially provided to the cooling circuit.

Figure 2:
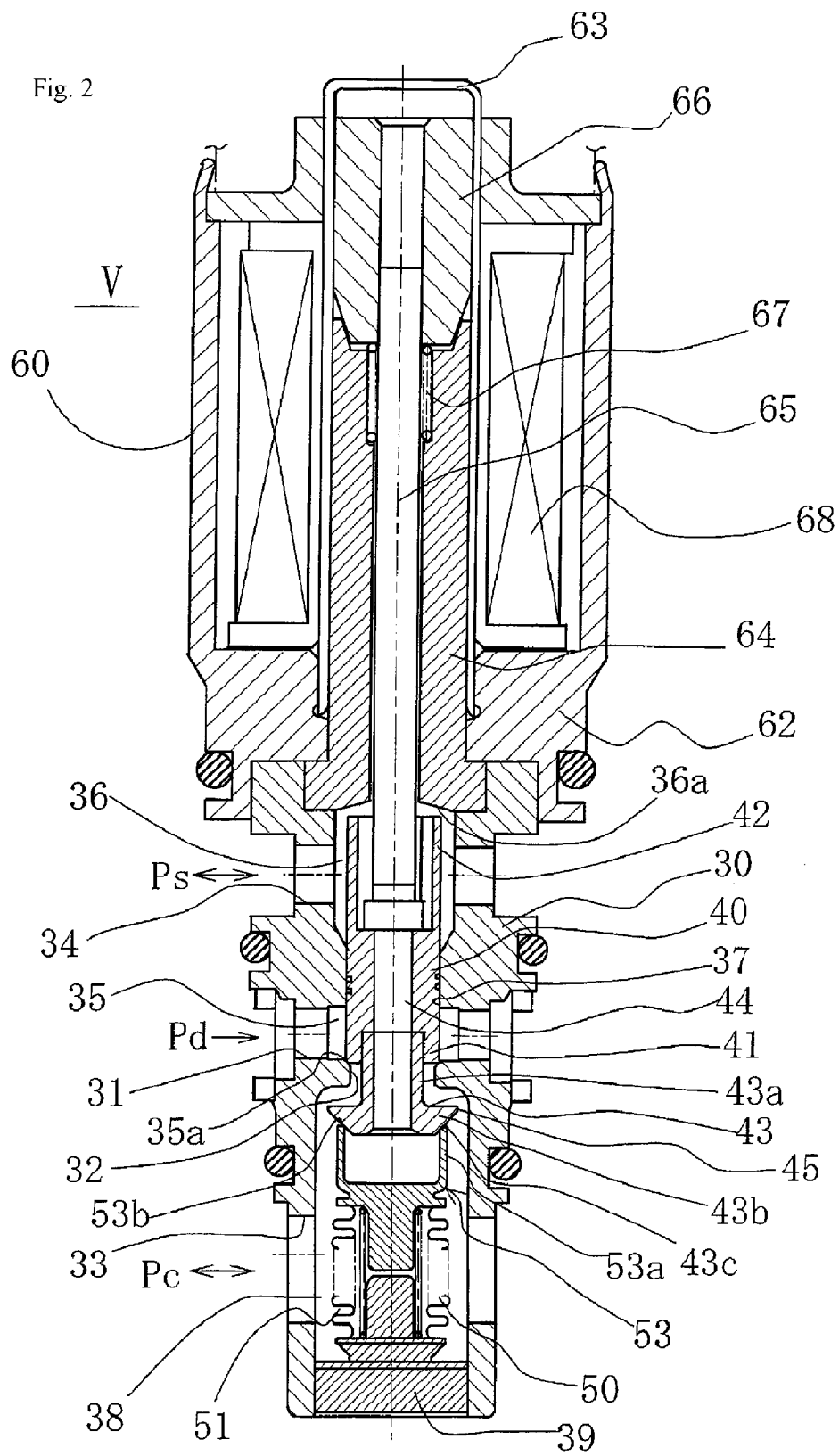
FIG. 2 is a front cross-section view showing an embodiment of the capacity control valve according to the present invention.

As shown in FIG. 2, the capacity control valve V comprises a body 30 formed from a metal material or a resin material; a valve body 40 arranged in the body 30 so as to be capable of reciprocating motion; a pressure sensitive body 50 urging the valve body 40 in one direction; a solenoid 60, which is connected to the body 30 and which exerts an electromagnetic driving force on the valve body 40; and other elements.

The solenoid 60 comprises: a casing 62 connected to the body 30; a sleeve 63, one end of which is closed; a cylindrical fixed iron core 64 arranged on the inside of the casing 62 and the sleeve 63; a drive rod 65 forming an interconnecting channel 44, the drive rod being capable of reciprocating motion within the fixed iron core 64, and having a distal end linked to the valve body 40; a movable iron core 66 secured to the other end side of the drive rod 65; a coil spring 67, which urges the movable iron core 66 towards a direction in which a first valve part 41 is opened; an excitation coil 68, wound on the outside of the sleeve 63 with a bobbin interposed therebetween; and other elements.

The body 30 comprises: interconnecting channels 31, 32, 33, which function as discharge-side channels; interconnecting channels 33, 34, which function as intake-side channels together with the interconnecting channel 44 of the valve body 40 described further below; a first valve chamber 35 formed partway along the discharge-side channels; a second valve chamber 36 formed partway along the intake-side channels; a guide channel 37 for guiding the valve body 40; a third valve chamber 38 formed, nearer the control chamber 12, on the discharge-side channels and the intake-side channels; and other elements. A blocking member 39, which demarcates the third valve chamber 38 and constitutes a part of the body 30, is mounted by screwing onto the body 30.

Specifically, the interconnecting channel 33 and the third valve chamber 38 are formed so as to also function as a part of the discharge-side channels and the intake-side channels. The interconnecting channel 32 forms a valve hole that links the first valve chamber 35 and the third valve chamber 38 and that allows the valve body 40 to penetrate (i.e., allows the valve body 40 through while securing spacing for channeling the fluid). The interconnecting channels 31, 33 and 34 are formed as a plurality so as to be arranged radially in the circumferential direction. For example, four interconnecting channels may be formed at 90° intervals.

In the first valve chamber 35, a seat surface 35a for seating the first valve part 41 of the valve body 40 described further below is formed on an edge section of the interconnecting channel (valve hole) 32. In the second valve chamber 36, a seat surface 36a for seating a second valve part 42 of the valve body 40 described further below is formed at an end section of the fixed iron core 64 described further below.

The valve body 40 is formed so as to be substantially cylindrical, and comprises: the first valve part 41 on one end side; the second valve part 42 on the other end side; a third valve part 43 subsequently provided on the opposite side from the second valve part 42 with respect to the first valve part 41; a interconnecting channel 44, which axially penetrates from the second valve part 42 to the third valve part 43, and which functions as an intake-side channel; and other elements.

The third valve part 43 has a shape in which the diameter expands from small to large from the first valve chamber 35 towards the third valve chamber 38. A small-diameter section 43*a* is inserted through the interconnecting channel (valve hole) 32. A tapered engaging surface 43*c*, which faces an adaptor 53 described further below, is formed on the third-valve-chamber 38 side of a large diameter section 43*b*.

In FIG. 2, the pressure sensitive body 50 comprises a bellows 51, the adaptor 53, and other elements. One end of the bellows 51 is fixed to the blocking member 39, and the other end (free end) holds the adaptor 53.

Figure 3:
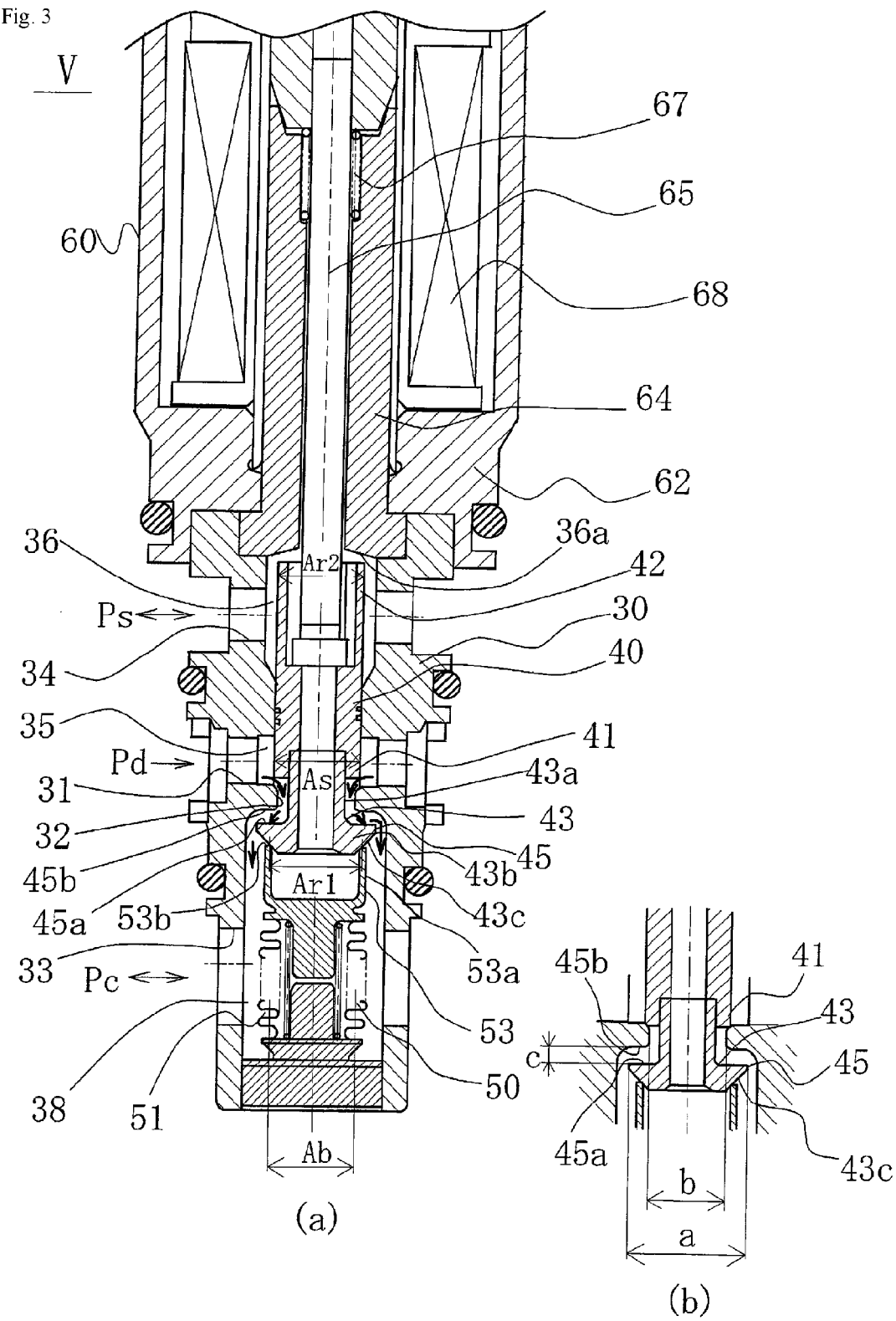
FIG. 3 is a cross-section view of the principal section of the capacity control valve according to the embodiment, where (a) shows the state when the valve is open and (b) shows the vicinity of the third valve part and the discharged-fluid-receiving part when the valve is closed.

As shown in FIG. 3, the adaptor 53 has a hollow cylindrical section 53*a*, having a substantially U-shaped cross section, the distal end of which engages with the third valve part 43. An annular seat surface 53*b*, which faces, and engages/disengages with respect to the tapered engaging surface 43*c* of the third valve part 43 is provided to the distal end of the hollow cylindrical section 53*a*.

The pressure sensitive body 50 is arranged in the third valve chamber 38, and actuates so as to lengthen (expand) and thereby exert an urging force in a direction so as to open the first valve part 41, and contract in concert with an increase in the ambient pressure (i.e., pressure in the interconnecting channel 44 of the valve body 40 and the third valve chamber 38) and reduce the urging force acting on the first valve part 41.

FIG. 3 is a cross-section view showing the principal section of the capacity control valve according to the present embodiment. FIG. 3(*a*) shows the state in which the valve is open, and FIG. 3(*b*) shows the vicinity of the third valve part and the discharged-fluid-receiving part when the valve is closed.

A discharged-fluid-receiving part 45 for receiving the pressure of the discharged fluid is provided to the outer periphery section of the large diameter section 43*b* of the third valve part 43 so as to have an outside diameter greater than the diameter of the valve hole 32 interconnecting the first valve chamber and the third valve chamber. The discharged-fluid-receiving part 45 may be provided integrally or separately with respect to the third valve part 43. In FIG. 3(*a*), a surface 45*a* of the discharged-fluid-receiving part 45 that receives the pressure of the discharged fluid is provided as a flat surface orthogonal to the flow direction of the discharged fluid. The discharged-fluid-receiving part 45 is adapted for receiving the pressure of the discharged fluid when the first valve part 41 separates from the seat surface 35*a* and the valve hole 32 is cleared, and the discharged fluid indicated by an arrow (discharge pressure Pd) flows into the third valve chamber 38 through the valve hole 32. When the discharged-fluid-receiving part 45 receives the pressure of the discharged fluid, the valve body 40 is subjected to a force acting in a direction so as to close the first valve part 41.

Therefore, in a state in which the first valve part 41 has separated from the seat surface 35*a* and the interconnecting channel (valve hole) 32 is cleared (i.e., the state shown in FIG. 3(*a*)), a force, acting in a direction so as to close the first valve part 41, is always acting on the valve body 40.

In the present example, a tapered engaging surface 43*c* of the third valve part 43, which engages with a seat surface 53*b* of the adaptor 53, is formed from the bottom surface to the outer periphery of the discharged-fluid-receiving part 45.

In FIG. 3(*b*), the outside diameter a of the discharged-fluid-receiving part 45 is preferably set to 120% to 170% of the diameter of the interconnecting channel (valve hole) 32 in order to secure an area for receiving the pressure of the discharged fluid. It shall be apparent that a space for channeling the discharged fluid is secured between the outer periphery section of the discharged-fluid-receiving part 45 and the inner periphery section of the third valve chamber 38. Also, the clearance c between the surface 45*a* of the discharged-fluid-receiving part 45 for receiving the pressure of the discharged fluid and a body-30-side surface 45*b* facing the surface 45*a* is preferably set to 210% to 250% of the maximum stroke of the valve body 40 in a closed state, in order to secure an adequate flow amount for the discharged fluid.

Figure 4:
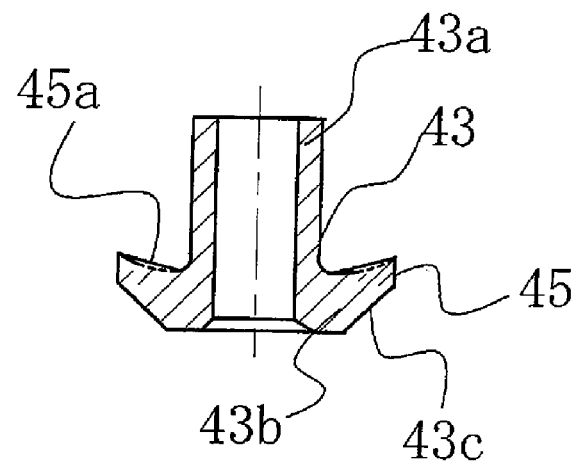
FIG. 4 shows a modification of the third valve part and the discharged-fluid-receiving part.
Figure 4:
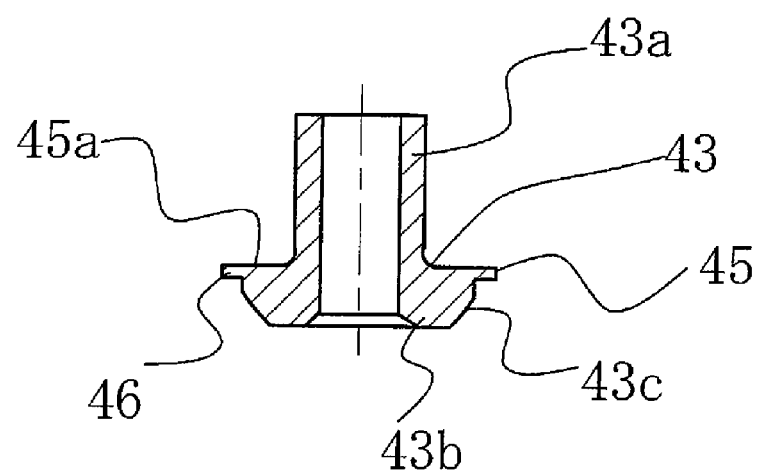
Figure 5:
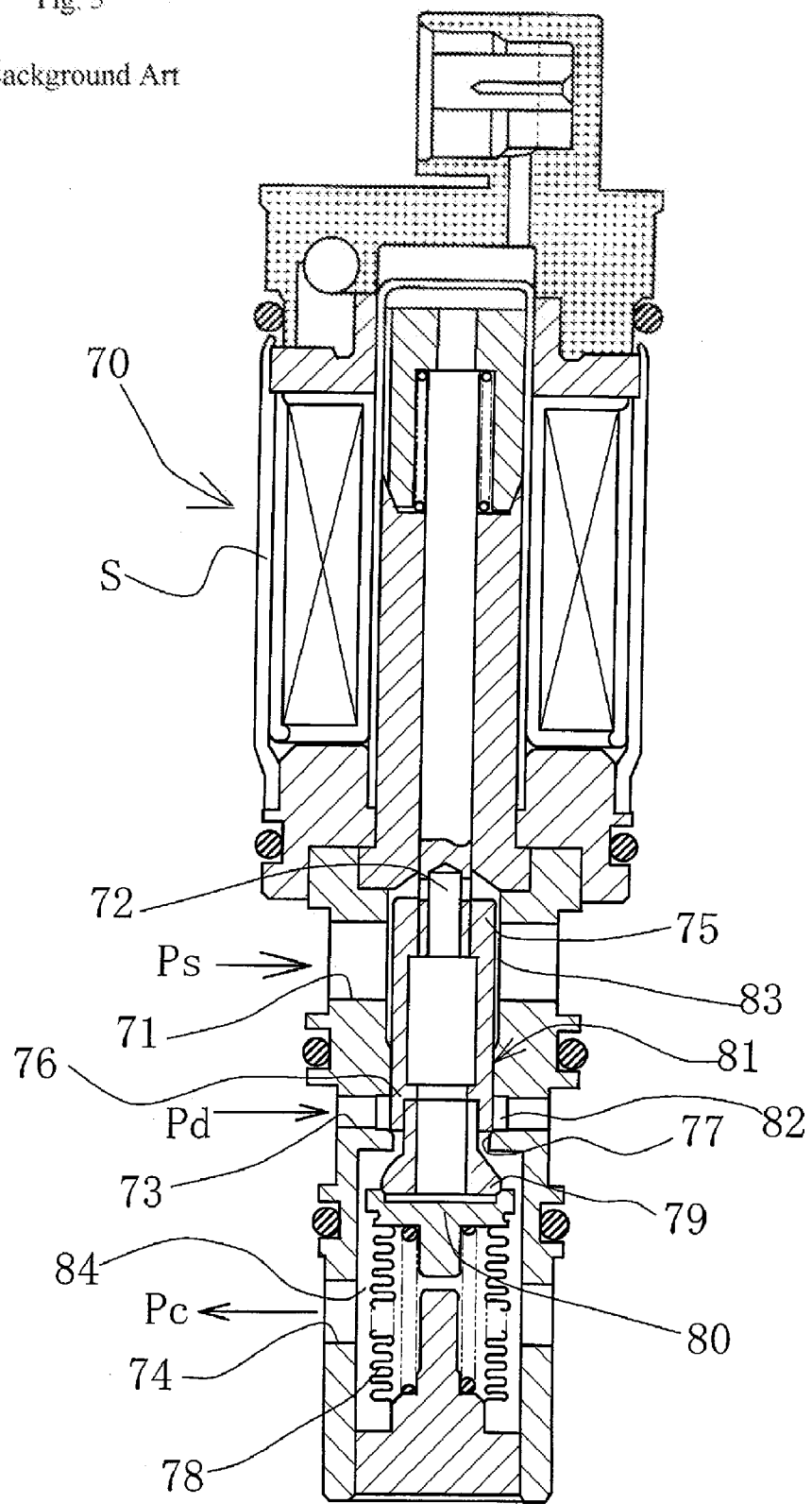
FIG. 5 is a front cross-section view showing a capacity control valve according to prior art.
Figure 6:
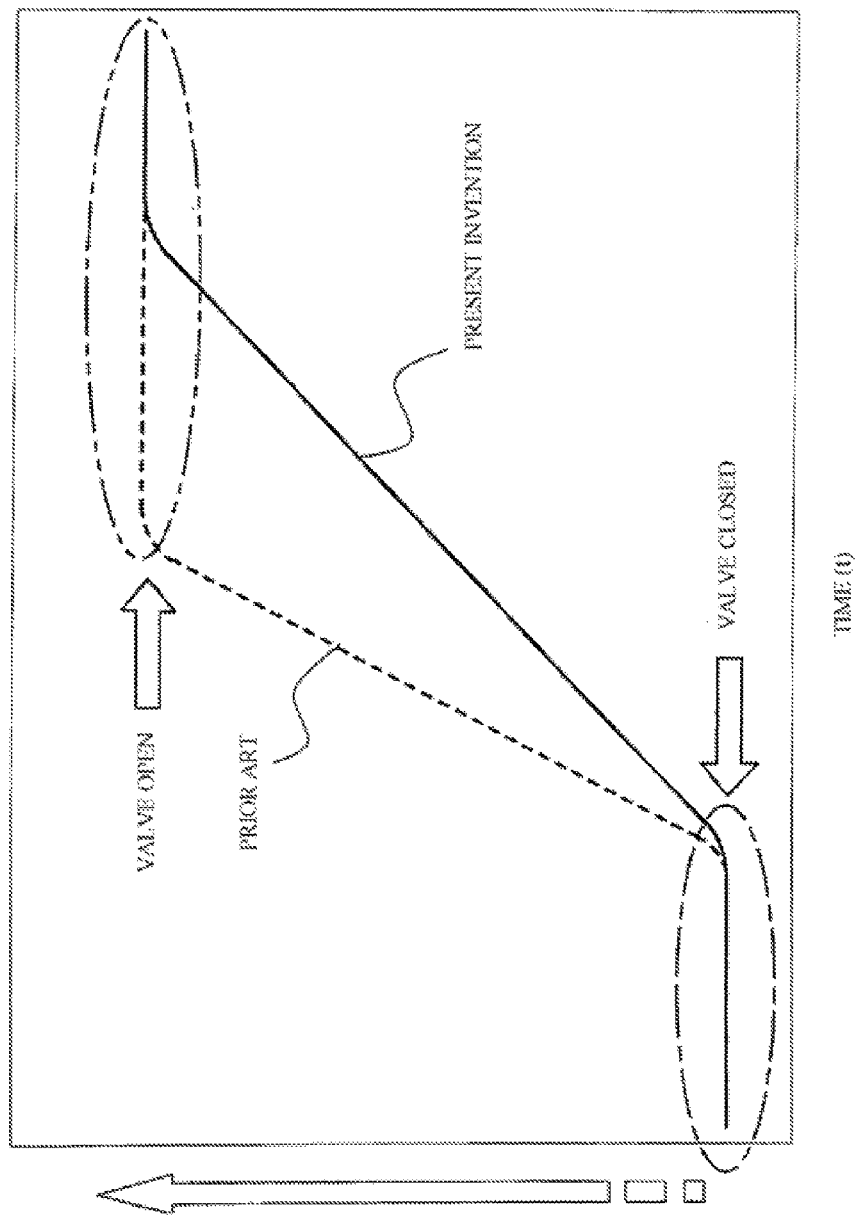
FIG. 6 illustrates the behaviour characteristics of a valve body according to prior art and a valve body of the present invention when the valve is open.

FIG. 4 depicts diagrams of a modification of the third valve part and the discharged-fluid-receiving part.

As shown in FIG. 4(*a*), the surface 45*a* of the discharged-fluid-receiving part 45 for receiving the discharged fluid may be provided as flat (solid lines) or curved (two-dot dashed lines) surfaces inclined upstream at an acute angle relative to a plane that is orthogonal to the flow direction of the discharged fluid. In such an instance, the pressure of the discharged fluid can be received by a greater extent.

If the surface 45*a* for receiving the pressure of the discharged fluid is shaped so as to be inclined upstream with regards to {the flow of} the discharged fluid as shown in FIG. 4(*a*), the reference used for the clearance c between the surface 45*a* for receiving the pressure and the body-30-side surface 45*b* will be the narrowest portion.

FIG. 4(*b*) shows an example in which a flange 46 is integrally provided to the outer periphery of the third valve part 43, and the discharged-fluid-receiving part 45 is formed. In such an instance, the tapered engaging surface 43*c* of the third valve part 43, which engages with the seat surface 53*b* of the adaptor 53, is only formed to a position at which {the engaging surface 43*c*} engages with a surface extending perpendicularly downwards from the lower surface on the inner periphery section of the flange 46, reducing the weight of the third valve part 43 and the discharged-fluid-receiving part 45. Also, forming the flange 46 separately and welding or otherwise securing the flange 46 to the outer periphery of the third valve part 43 facilitates manufacturing the third valve part 43.

In the present invention, a discharged-fluid-receiving part 45 having a diameter greater than that of the valve hole 32 is provided to the large diameter section 43*b* of the third valve part 43, whereby in a region partway between closed and open positions, the discharged-fluid-receiving part 45 receives the pressure of the discharged fluid, and a force acting in a direction so as to close the first valve part 41 acts on the valve body 40. Thus, when the first valve part 41 is opened, the discharged-fluid-receiving part 45 receives the pressure of the discharged fluid. It is therefore possible to obtain a capacity control valve in which the actuation response of the valve body 40 during an opening action is moderated; the sensitivity to a rise in pressure in the crank chamber, caused by a rapid increase in the amount of coolant flowing into the crank chamber, is prevented; and the action of the valve body 40 is stable. Therefore, in air-conditioning control using an automotive air-conditioning device in which there is used a swash plate variable capacity compressor fitted with the capacity control valve of the present invention, it is possible to prevent any occurrence of temperature fluctuation in the vehicle compartment, adverse effect on air conditioning control, torque fluctuation in the compressor, adverse effect on the engine, and other problems.

In the above configuration, as shown in FIG. 3, when Ab represents the effective pressure-bearing area over the effective diameter of the pressure-sensitive body 50 (bellows 51), Ar1 represents the pressure-bearing area over the diameter of the seal of the third valve part 43, As represents the pressure-bearing area over the diameter of the seal of the first valve part 41; Ar2 represents the pressure-bearing area over the diameter of the seal of the second valve part 42; Fb represents the urging force of the pressure sensitive body 50; Fs represents the urging force of the coil spring 67; Fsol represents the urging force by the electromagnetic driving force from the solenoid 60; Pd represents the discharge pressure of the discharge chamber 11; Ps represents the intake pressure of the intake chamber 13; and Pc represents the control chamber pressure of the control chamber (crank chamber) 12; the equilibrium expression of forces acting on the valve body 40 is:

$$Pc \cdot (Ab \cdot Ar1) + Pc \cdot (Ar1 \cdot As) + Ps \cdot Ar1 + Ps \cdot (Ar2 - Ar1) + Pd \cdot (As - Ar2) = Fb + Fs - Fsol.$$

Next, a description will be given for an operation when the swash plate variable capacity compressor M comprising the capacity control valve V is applied to an air conditioning system of an automobile.

First, when the rotary driving force of the engine causes rotation of the rotary shaft 20 through a transmission belt (not shown) and the driven pulley 24, the swash plate 21 rotates integrally with the rotary shaft 20. When the swash plate 21 rotates, the pistons 22 move in a reciprocating motion in the cylinders 14 at a stroke corresponding to the tilt angle of the swash plate 21, and coolant gas taken into the cylinders 14 from the intake chamber 13 is compressed by the pistons 22 and discharged into the discharge chamber 11. The discharged coolant gas is fed into the evaporator 27 from the condenser 25 through the expansion valve 16, and returns to the intake chamber 13 while undergoing a refrigeration cycle.

The amount of the coolant gas discharged is determined by the stroke of the pistons 22, and the stroke of the pistons 22 is determined by the tilt angle of the swash plate 21, controlled by the pressure in the control chamber 12 (control chamber pressure Pc).

When the pistons 22 are performing a compression, blowby gas from the clearance between the pistons 22 and the cylinders 14 always flows into the control chamber 12 and acts so as to increase the pressure Pc in the control chamber 12. However, since the fixed orifice 19 is provided, even if the interconnecting channels (intake-side channels) 33, 44, 34 are closed, a certain amount of pressure is released into the intake chamber from the control chamber 12, and the pressure in the control chamber 12 can be maintained at an appropriate level.

In a state of operation at the maximum discharge amount, a predetermined current (I) passes through the solenoid 60 (coil 68); the movable iron core 66 and the drive rod 65 acts against the urging force of the pressure sensitive body 50 and the coil spring 67; the first valve part 41 rests on the seat surface 35a and blocks the interconnecting channels (discharge-side channels) 31, 32; the second valve part 42 moves away from the seat surface 36a and the valve body 40 moves to a position at which the link channels (intake-side channels) 34, 44 are clear.

During normal control (between maximum capacity operation and minimum capacity operation), the size of the current passing through the solenoid 60 (coil 67) is controlled as appropriate, and the electromagnetic driving force (urging force) is varied. Specifically, the position of the valve body 40 is adjusted as appropriate using the electromagnetic driving force, and the degree of opening of the first valve part 41 and the degree of opening of the second valve part 42 are controlled so that the desired discharge amount is obtained. In this state, when the discharged fluid (discharge pressure Pd) flows through the valve hole 32 and into the third valve chamber 38, the discharged-fluid-receiving part 45 of the third valve part 43 receives the pressure of the discharged fluid, and a force acting in a direction so as to close the first valve part 41 acts on the valve body 40. Therefore, it becomes possible to obtain a capacity control valve in which the actuation response of the valve body 40 during the opening action is moderated, an excessive increase in the sensitivity to a rise in pressure in the crank chamber caused by a rapid increase in the amount of coolant flowing into the crank chamber is prevented, and the action of the valve body 40 is stable. Therefore, in air-conditioning control using an automotive air-conditioning device in which there is used a swash plate variable capacity compressor fitted with the capacity control valve of the present invention, it is possible to prevent any occurrence of temperature fluctuation in the vehicle compartment, adverse effect on air conditioning control, torque fluctuation in the compressor, adverse effect on the engine, and other problems.

In a state of operation at minimum capacity, no current passes through the solenoid 60 (coil 68); the movable iron core 66 and the drive rod 65 is caused by the urging force from the coil spring 67 to retreat and stops at a rest position; the first valve part 41 moves away from the seat surface 35a and the interconnecting channels (discharge-side channels) 31, 32 are cleared; and the valve body 40 moves to a position at which the second valve part 42 rests on the seat surface 36a and the interconnecting channels (intake-side channels) 34, 44 are in a blocked state. The discharged fluid (discharge pressure Pd) is thereby fed through the interconnecting channels (discharge-side channels) 31, 32, 33 into the control chamber 12. The tilt angle of the swash plate 21 is controlled so as to be minimized, and the stroke of the pistons 22 is minimized. As a result, the amount of the coolant gas discharged is minimized.

In this state, when the discharged fluid (discharge pressure Pd) flows through the valve hole 32 into the third valve chamber 38, the discharged-fluid-receiving part 45 of the third valve part 43 receives the pressure of the discharged fluid, and a force acting in a direction so as to close the first valve part 41 acts on the valve body 40, but the state of the valve body 40 is maintained by the urging force of the coil spring 67.

As described above, during a state of operation during normal control, when the discharged fluid (discharge pressure Pd) flows through the valve hole 32 and into the third valve chamber 38, the discharged-fluid-receiving part 45 of the third valve part 43 receives the pressure of the discharged fluid, and a force acting in a direction so as to close the first valve part 41 acts on the valve body 40. Therefore, it becomes possible to obtain a capacity control valve in which the actuation response of the valve body 40 during the opening action is moderated, an excessive increase in the sensitivity to a rise in pressure in the crank chamber caused by a rapid increase in the amount of coolant flowing into the crank chamber is prevented, and the action of the valve body 40 is stable.

REFERENCE SIGNS LIST

10 Casing
11 Discharge chamber
12 Control chamber (crank chamber)

13 Intake chamber
14 Cylinder
15 Interconnecting channel
16 Interconnecting channel
17 Interconnecting channel
18 Interconnecting channel
19 Fixed orifice
20 Rotary shaft
21 Swash plate
22 Piston
23 Connection member
24 Driven pulley
25 Condenser
26 Expansion valve
27 Evaporator
30 Body
31, 32 Interconnecting channel (discharge-side channel)
32 Interconnecting channel (valve hole)
33 Interconnecting channel (control-chamber-side channel)
34 Interconnecting channel (intake-side channel)
35 First valve chamber
35a Seat surface
36 Second valve chamber
36a Seat surface
37 Guide channel
38 Third valve chamber
39 Blocking member
40 Valve body
41 First valve part
42 Second valve part
43 Third valve part
43a Small-diameter section of third valve part
43b Large-diameter section of third valve part
43c Engaging surface of third valve part
44 Interconnecting channel
45 Discharged-fluid-receiving part
45a Surface of discharged-fluid-receiving part that receives pressure of discharged fluid
45b Body-side surface facing surface of discharged-fluid-receiving part that receives pressure of discharged fluid
46 Flange
50 Pressure sensitive body
51 Bellows
53 Adaptor
53a Hollow cylindrical section
53b Seat surface
60 Solenoid
62 Casing
62 Sleeve
64 Fixed iron core
65 Drive rod
66 Movable iron core
67 Coil spring
68 Coil for excitation
M Swash plate variable capacity compressor
V Capacity control valve
Pd Discharge pressure
Ps Intake pressure
Pc Control chamber pressure

The invention claimed is:

1. A capacity control valve characterized in being provided with:
a discharge-side channel for interconnecting a discharge chamber for discharging a fluid and a control chamber for controlling the amount of the fluid discharged;
a first valve chamber formed partway along said discharge-side channel;
an intake-side channel for interconnecting an intake chamber for drawing in the fluid and said control chamber;
a second valve chamber formed partway along said intake-side channel;
a valve body integrally comprising a first valve part for opening and closing said discharge-side channel in said first valve chamber and a second valve part for opening and closing said intake-side channel in said second valve chamber, a reciprocating motion performed by the valve body causing mutually opposite opening and closing actions to be performed;
a third valve chamber formed partway along said intake-side channel, nearer said control chamber than said second valve chamber;
a pressure-sensitive body arranged in said third valve chamber, the pressure-sensitive body extending and thereby exerting an urging force in a direction so as to open said first valve part, and contracting in concert with an increase in ambient pressure;
an adaptor provided to a free end, in the direction of extension, of said pressure-sensitive body, the adaptor having an annular seat surface on its top;
a third valve part provided above the adaptor and constituted by a small-diameter section and a large-diameter section, said large-diameter section having an annular tapered engaging surface, which moves integrally with said valve body in said third valve chamber and engages and disengages with respect to the annular seat surface of the adaptor, thereby opening and closing said intake-side channel, said annular tapered engaging surface being tapered extending outward in an upward direction so that a lower part of the annular tapered engaging surface has a diameter smaller than that of an upper part of the annular tapered engaging surface;
a solenoid for exerting an electromagnetic driving force on said valve body in a direction so as to close said first valve part, in response to a pulse width modulation signal having a uniform frequency; and
a discharged-fluid-receiving part of larger diameter than the diameter of a valve hole interconnecting the first valve chamber and the third valve chamber, the discharged-fluid-receiving part being provided to an upper part of said large-diameter section of said third valve part, wherein the discharged-fluid-receiving part is formed by providing a flange only to the upper part of the large-diameter section of said third valve part above the annular tapered engaging surface, wherein the flange is not in contact with the tapered engaging surface and extends radially outwardly beyond the tapered engaging surface outside the tapered engaging surface as viewed in an axial direction, and an upper surface of the flange constituting the discharged-fluid-receiving part extends perpendicularly to the axial direction.

2. The capacity control valve according to claim 1, characterized in that a surface of said discharged-fluid-receiving part that receives the discharged fluid is provided as a flat surface orthogonal to a direction in which the discharged fluid flows.

3. The capacity control valve according to claim 1, characterized in that the outside diameter of the discharged-fluid-receiving part is set to 120% to 170% of the diameter of the valve hole.

4. The capacity control valve according to claim 1, characterized in that the clearance between a surface of the discharged-fluid-receiving part that receives the pressure of the discharged fluid and a body-side surface that faces the surface is set to 210% to 250% of the maximum stroke of the valve body when the valve is closed.

5. The capacity control valve according to claim 2, characterized in that the outside diameter of the discharged-fluid-receiving part is set to 120% to 170% of the diameter of the valve hole.

6. The capacity control valve according to claim 2, characterized in that the clearance between a surface of the discharged-fluid-receiving part that receives the pressure of the discharged fluid and a body-side surface that faces the surface is set to 210% to 250% of the maximum stroke of the valve body when the valve is closed.

7. The capacity control valve according to claim 3, characterized in that the clearance between a surface of the discharged-fluid-receiving part that receives the pressure of the discharged fluid and a body-side surface that faces the surface is set to 210% to 250% of the maximum stroke of the valve body when the valve is closed.

\* \* \* \* \*